United States Patent
Toho et al.

(10) Patent No.: US 12,359,693 B2
(45) Date of Patent: Jul. 15, 2025

(54) TAPERED ROLLER BEARING

(71) Applicant: NTN CORPORATION, Osaka (JP)

(72) Inventors: Shouta Toho, Kuwana (JP); Naoki Nakatochi, Kuwana (JP)

(73) Assignee: NTN CORPORATION, Osaka (JP)

( * ) Notice: Subject to any disclaimer, the term of this patent is extended or adjusted under 35 U.S.C. 154(b) by 94 days.

(21) Appl. No.: 18/113,272

(22) Filed: Feb. 23, 2023

(65) Prior Publication Data

US 2023/0193955 A1 Jun. 22, 2023

Related U.S. Application Data (63) Continuation of application No. PCT/JP2021/032076, filed on Sep. 1, 2021.

(30) Foreign Application Priority Data

Sep. 2, 2020 (JP) .................. 2020-147202

(51) Int. Cl.
*F16C 33/46* (2006.01)
*F16C 19/36* (2006.01)

(52) U.S. Cl.
CPC .......... *F16C 33/467* (2013.01); *F16C 19/364* (2013.01)

(58) Field of Classification Search
CPC ............... F16C 19/364; F16C 33/4605; F16C 33/4617; F16C 33/4623; F16C 33/4629; F16C 33/4635; F16C 33/54; F16C 33/542; F16C 33/543
See application file for complete search history.

(56) References Cited

U.S. PATENT DOCUMENTS

| | | | |
|---|---|---|---|
| 1,909,617 A * | 5/1933 | Hektner | F16C 33/543 384/572 |
| 8,480,308 B2 | 7/2013 | Masuda et al. | |
| 9,115,759 B2 | 8/2015 | Kanda | |
| 10,378,580 B2 | 8/2019 | Hayashi et al. | |
| 11,306,774 B2 | 4/2022 | Zembutsu et al. | |
| 2007/0041677 A1 | 2/2007 | Masuda et al. | |
| 2007/0177838 A1 | 8/2007 | Tsujimoto | |
| 2013/0336610 A1 | 12/2013 | Kanda | |

(Continued)

FOREIGN PATENT DOCUMENTS

| | | |
|---|---|---|
| CN | 103410853 A | 11/2013 |
| CN | 203463492 U * | 3/2014 |
| DE | 102015219706 A1 * | 4/2017 |

(Continued)

OTHER PUBLICATIONS

Machine Translation of JPH1089353 (Year: 1998).*

(Continued)

*Primary Examiner* — Alan B Waits (57) ABSTRACT

Provided is a tapered roller bearing (1) for which a dimensionless number X is defined by the following formula (1) based on a small-diameter-side gap S1 which is a gap between a small-diameter-side annular part (6) of a retainer (5) and a small collar part (2b) of an inner ring (2), a large-diameter-side gap S2 which is a gap between the large-diameter-side annular part (7) and a large collar part (2c) of the inner ring (2), an average roller diameter d, a roller length l, and an outer member angle α. The dimensionless number X falls within a range of 0.69<X<1.12.

6 Claims, 12 Drawing Sheets

(56) References Cited

U.S. PATENT DOCUMENTS

2018/0119735 A1  5/2018  Hayashi et al.
2021/0054877 A1  2/2021  Zembutsu et al.

FOREIGN PATENT DOCUMENTS

| | | | | |
|---|---|---|---|---|
| JP | H1089353 A | * | 4/1998 | |
| JP | 2005-106234 | | 4/2005 | |
| JP | 2007051715 A | * | 3/2007 | ............ F16C 19/225 |
| JP | 2008069875 A | * | 3/2008 | ............ F16C 19/364 |
| JP | 2008-261367 A | | 10/2008 | |
| JP | 2009-41651 | | 2/2009 | |
| JP | 2009192069 A | * | 8/2009 | ............ F16C 19/364 |
| JP | 2011202714 A | * | 10/2011 | |
| JP | 2017-003109 A | | 1/2017 | |
| JP | 2017-8952 | | 1/2017 | |
| JP | 2017-214970 | | 12/2017 | |
| JP | 2018-109448 A | | 7/2018 | |
| JP | 2021-127774 | | 9/2021 | |
| WO | WO 2013/011963 A1 | | 1/2013 | |
| WO | WO 2016/194981 A | | 12/2016 | |
| WO | WO 2019/172446 A1 | | 9/2019 | |

OTHER PUBLICATIONS

Machine Translation of JP2007051715 (Year: 2007).*
Machine Translation of JP2008069875 (Year: 2008).*
Machine Translation of JP2009192069 (Year: 2009).*
Machine Translation of JP2011202714 (Year: 2011).*
Machine Translation of CN203463492 (Year: 2014).*
Machine Translation of DE102015219706 (Year: 2017).*
International Search Report issued in International Application No. PCT/JP2021/032076 dated Nov. 16, 2021.

* cited by examiner

TAPERED ROLLER BEARING

CROSS REFERENCE TO THE RELATED APPLICATION

This application is a continuation application, under 35 U.S.C. § 111(a) of international patent application No. PCT/JP2021/032076, filed Sep. 1, 2021, which claims priority to Japanese patent application No. 2020-147202, filed Sep. 2, 2020, the entire disclosures of all of which are herein incorporated by reference as a part of this application.

BACKGROUND OF THE INVENTION

Field of the Invention

The present invention relates to a tapered roller bearing which can be used in a part subjected to centrifugal force such as a planetary reduction gear part of a construction machine and, in particular, a planetary part at the first stage where particularly large centrifugal force acts.

Description of Related Art

Figure 12:
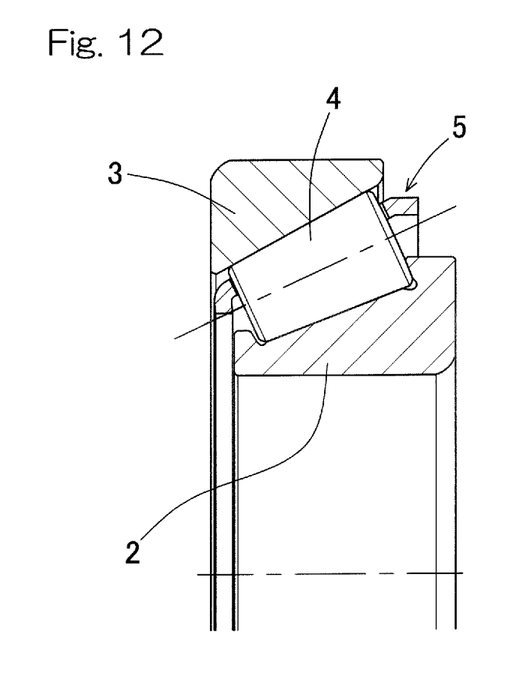
FIG. 12 is a section view of a conventional tapered roller bearing of rolling element-guided type.
Figure 13A:
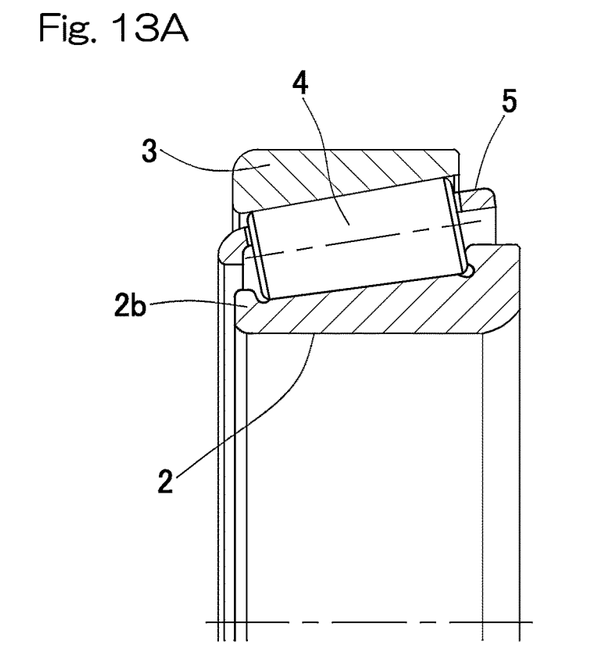
FIG. 13A illustrates action of centrifugal force on a tapered roller bearing of rolling element-guided type.
Figure 13B:
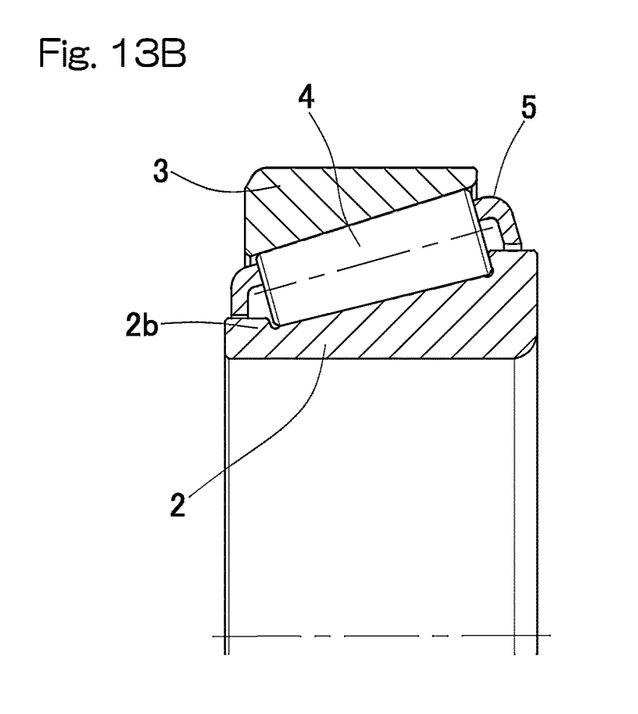
FIG. 13B illustrates action of centrifugal force on a tapered roller bearing of an inner ring-guided type.

Common tapered roller bearings are of roller-guided type in which a retainer 5 is guided by tapered rollers 4, for example, as shown in FIG. 12. However, tapered roller bearings used in a revolving environment such as a planetary part of a planetary reduction gear have, if they are of rolling element-guided type, low stability in retainer behavior and extensive wear in pillar parts due to centrifugal force generated by revolutions. Therefore, bearings of raceway guide type are preferred for such applications.

Figure 14A:
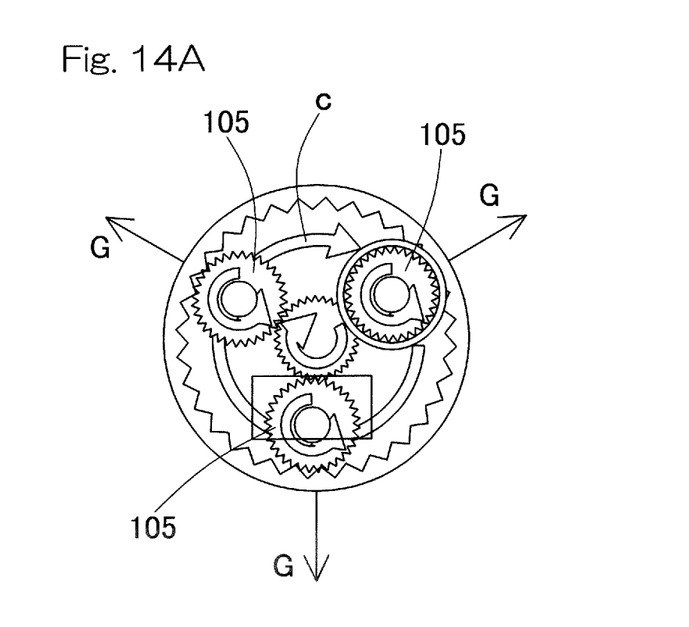
FIG. 14A illustrates action of centrifugal force on a tapered roller bearing of rolling element-guided type.
Figure 14B:
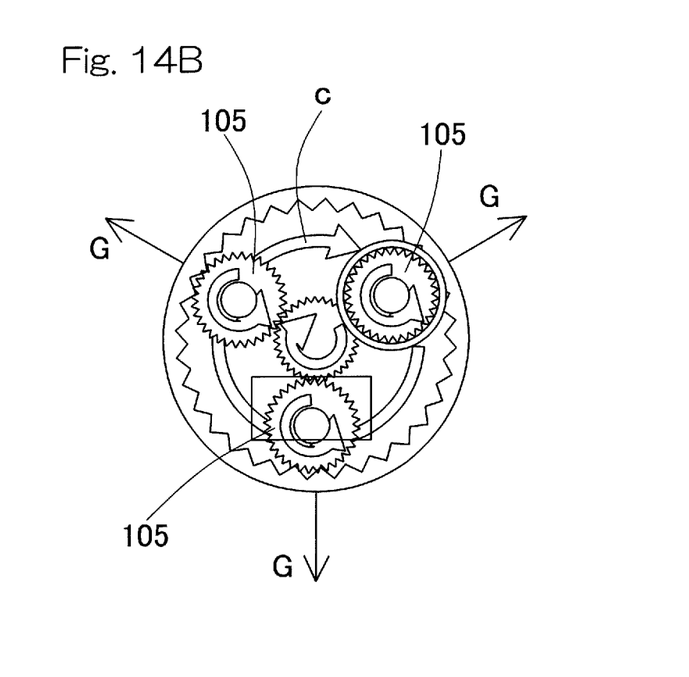
FIG. 14B illustrates action of centrifugal force on a tapered roller bearing of an inner ring-guided type.

To illustrate this point, FIG. 13A, FIG. 14A, FIG. 15A, and FIG. 16A show the working of a tapered roller bearing which employs a standard roller-guided retainer, and FIG. 13B, FIG. 14B, FIG. 15B, and FIG. 16B show that of a tapered roller bearing which employs an inner ring-guided retainer adapted for high centrifugal force. As shown in FIG. 14A and FIG. 14B, in a case where tapered roller bearings are used for planetary rotating bodies 105 of a planetary reduction gear, each tapered roller bearing makes revolutions as indicated by arrow c, so that centrifugal force G acts on the whole tapered roller bearing. This is also the case with a tapered roller bearing which employs an outer ring-guided retainer adapted for high centrifugal force.

Figure 15A:
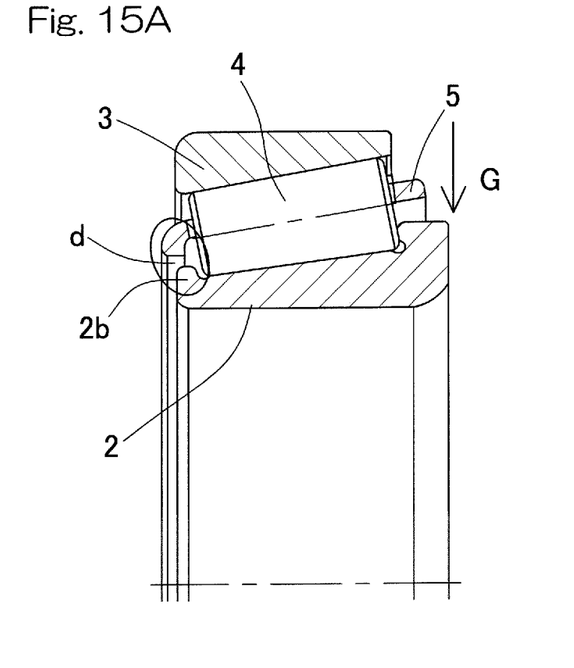
FIG. 15A illustrates action of centrifugal force on a tapered roller bearing of rolling element-guided type.
Figure 15B:
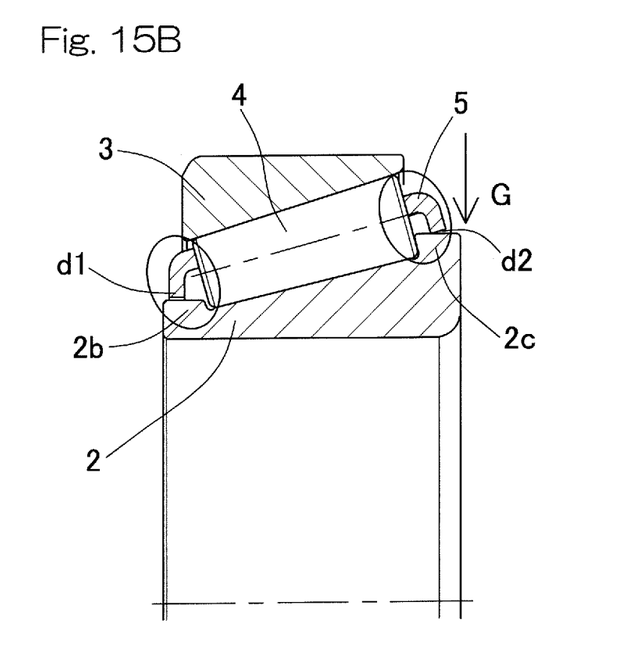
FIG. 15B illustrates action of centrifugal force on a tapered roller bearing of an inner ring-guided type.
Figure 16A:
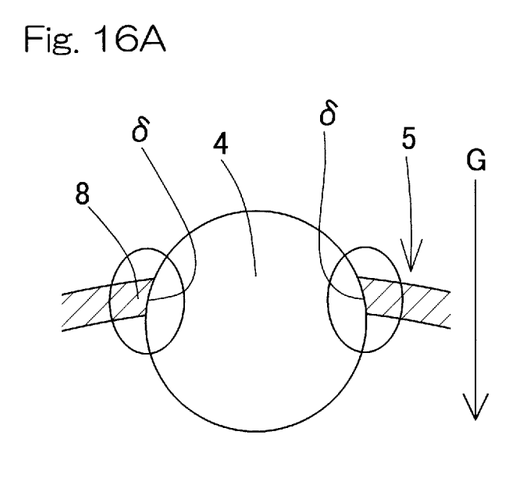
FIG. 16A illustrates action of centrifugal force on a tapered roller bearing of rolling element-guided type.
Figure 16B:
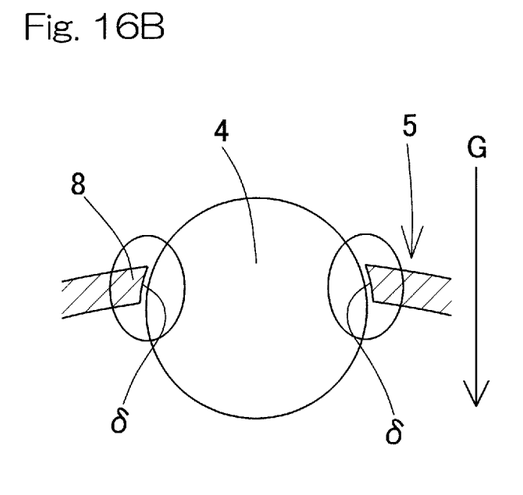
FIG. 16B illustrates action of centrifugal force on a tapered roller bearing of an inner ring-guided type.

As for the interaction between bearing components, when the centrifugal force G thus acts on the whole tapered roller bearing due to revolutions, the centrifugal force G causes the retainer 5 to be pulled radially inward, as shown in the bearing sections in FIG. 15A and FIG. 15B, assuming that the inner ring 2, which is the stationary raceway ring, of the tapered roller bearing is in a stationary state. In such a case, since the roller-guided bearing shown in FIG. 15A has a large gap d in the inner ring collar part, in particular, between the small collar part 2b and the retainer 5, the retainer 5 moves greatly in the radial direction as the retainer is pulled radially inward due to the centrifugal force G, so that gaps δ between the pocket inner surfaces of the retainer 5 and the tapered rollers 4 are eliminated as shown in FIG. 16A, resulting in increased wear on the pillar parts 8.

On the other hand, the inner ring-guided bearing shown in FIG. 13B, FIG. 14B, FIG. 15B, and FIG. 16B has small gaps d1, d2 between the inner ring collar part (small collar part 2b, large collar part 2c) and the retainer 5. Hence, the retainer 5 moves by a small amount in the radial direction when the retainer 5 is pulled radially inward due to the centrifugal force, so that the gaps δ remain between the pocket inner surfaces and the tapered rollers 4, resulting in reduced wear on the pocket inner surfaces of the pillar part 8.

A document about a tapered roller bearing of inner ring-guided type describes that the retainer is provided with collar parts on the small diameter side as well as the large diameter side, the collar parts being used as sliding surfaces to guide the retainer by the inner ring (for example, Patent Document 1).

RELATED DOCUMENT

Patent Document

[Patent Document 1] CN103410853A

SUMMARY OF THE INVENTION

Tapered roller bearings of roller-guided type which employ a retainer made from a metal plate such as a steel plate have the following problems.

Tapered roller bearings tend to have a variation in inner diameter dimension because the small-diameter-side portion of the retainer pillar part is swaged during assembling. Therefore, the retainer may be guided by a single collar (hereinafter, single collar-guided type) in some cases.

In a case where a tapered roller bearing is used in an environment where high centrifugal force acts such as a planetary part, the bearing rotates with the radially outer parts of the collar parts in contact with the radially inner parts of the retainer even on the side which is not designed to guide the retainer, due to unbalanced whirling and deformation of the retainer. Thus, the bearing is operated with the rotation axis of the retainer tilted.

If the bearing is operated with the rotation axis tilted, gyro moment is generated, so that axial force acts on the retainer. This axial force causes the retainer to move in the axial direction, so that the end faces of the rollers come in strong contact with the surface portions of the pocket inner surfaces of the retainer which face in the axial direction, resulting in wear and, therefore, poor durability.

An object of the present invention is to provide a tapered roller bearing of inner ring-guided type including a retainer made from a metal plate such as a steel plate, in which tilting of the rotation axis of the retainer is suppressed so that the retainer is less likely to wear, even if the bearing is used in a revolving environment.

A tapered roller bearing of inner ring-guided type according to the present invention includes:
an inner ring including collars on opposite sides of the inner ring,
an outer member including a rolling surface having an annular shape, the rolling surface facing a rolling surface of the inner ring,
a plurality of tapered rollers interposed between the inner ring and the outer member, and
a retainer configured to retain the plurality of tapered rollers, the retainer including: a small-diameter-side annular part, a large-diameter-side annular part, and pillar parts which are arranged at a plurality of positions in a circumferential direction and connect the small-diameter-side annular part and the large-diameter-side annular part, wherein a dimensionless number X falls within a range of 0.69<X<1.12, the dimensionless number X being calculated by the following formula defined by a small-diameter-side gap S1 which is a gap between the small-diameter-side annular part of the retainer and a small collar part of the inner ring, a large-diameter-side gap S2 which is a gap between the large-diameter-side annular part and a large collar part of the inner ring, an average roller diameter d, a roller length l, and an outer member angle α (where a is from 20° to 40°) which is a tapering angle at which the rolling surface of the outer member is inclined.

$$X = \frac{1}{\tan\alpha}\left(1 - \frac{S_1}{S_2}\frac{d}{l}\right)$$ [Math 1]

In order to appropriately maintain the inclination of a retainer during operation, use of an inner ring-guided retainer alone is not sufficient, and it is necessary to appropriately control the gaps between the rollers and the retainer during operation (i.e., radial gap and axial gap), in addition to the gaps between the respective radially outer parts of the collars of the inner ring and the retainer during standstill (i.e., the small-diameter-side gap S1 and the large-diameter-side gap S2). The gaps between the rollers and the retainer during operation are defined by the average roller diameter d and the roller length l. With this in mind, a dimensionless X which is determined on the basis of the average roller diameter d and the roller length l was conceived in relation to the small-diameter-side gap S1 and the large-diameter-side gap S2, and it was found that tilting of the rotation axis of the retainer can be suppressed by controlling the ratio of the small-diameter-side gap S1 to the large-diameter-side gap S2 such that the dimensionless X falls within an appropriate range (within the range of 0.69<X<1.12).

Thus, by reducing the difference between the gaps on the small diameter side and the large diameter side, the gaps being defined between the radially outer parts of the inner ring collars and the radially inner parts of the retainer, the bearing can be rotated with a smaller offset between the rotation axis of the retainer and the axis of the inner ring when centrifugal force acts. This makes it possible to reduce unbalanced whirling of the retainer and thereby to suppress wear of the retainer. Reduction in unbalanced whirling of the retainer makes it possible to reduce axial movement of the retainer due to gyro moment and to cause the bearing to operate in a stable state.

The outer member angle α is set within the range of from 20° to 40° for the following reasons.

A bearing having an outer member angle α of 20° or less has small capacity to support axial load.

A bearing having an outer member angle α of 40° or greater has large capacity to support axial load, but has small capacity to support radial load. Since tapered roller bearings used in an environment where centrifugal force acts, such as a planetary reduction gear part, mainly support radial load, bearing products having a large outer member angle α are rarely employed. In addition, bearing products having an outer member angle of 20° or less may not have sufficient capacity to support axial load, in a case where axial load is generated due to gear engagement in planetary reduction gears or the like.

In the present invention, the large-diameter-side annular part of the retainer may include a flanged part extending in a bending manner toward a radially inside with respect to the pillar parts, and the flanged part may define a bending angle with respect to the pillar parts within a range of 90°±10° with reference to a retainer angle at which the pillar parts are inclined with respect to a bearing axis. The retainer has an appropriate shape as an inner ring-guided retainer when the bending angle of the flanged part falls within the range of 90°±10°.

In the tapered roller bearing of the present invention, the large-diameter-side annular part of the retainer may include a flanged part extending in a bending manner toward a radially inside with respect to the pillar parts via a bent part having an arc shape, and the bent part may have a bent part R-dimension (radius dimension) which is a radius of curvature on a radially inner surface of the bent part within a range of from 20% to 90% relative to an axial length which is a length of the large-diameter-side annular part in a direction in which the pillar parts extend. In a case where the bent part R-dimension is 20% or lower relative to the axial length of the large-diameter-side annular part, greater stress concentration may occur during bending processing, possibly causing damage to the retainer. On the other hand, in a case where the bent part R-dimension is 90% or higher, the radially inner surface of the bent part curves too gradually in arc shape, so that the edges of the end faces of the rollers could interfere with the pocket opening edges.

In the tapered roller bearing of the present invention, the small-diameter-side annular part and the large-diameter-side annular part of the retainer may include flanged parts extending in a bending manner toward a radially inside with respect to the pillar parts, and the flanged parts may include, at a plurality of locations in a circumferential direction, oil passages in the form of cutouts or apertures which permit passage of lubricating oil inward and outward of the flanged parts in an axial direction of the bearing. Formation of the oil passages can facilitate passage of lubricating oil inward and outward of the flanged parts of the retainer, so that good lubrication can be achieved between the rolling surfaces of the tapered rollers and the pocket inner surfaces of the retainer.

In the tapered roller bearing of the present invention, a ratio of a section area of the large-diameter-side annular part of the retainer to a section area of the small-diameter-side annular part may fall within a range of from 1.0 to 1.2. In a case where the ratio of the section area of the large-diameter-side annular part to the section area of the small-diameter-side annular part falls within the range of from 1.0 to 1.2, the retainer can have appropriate weight balance between the large diameter side and the small diameter side, so that unbalanced whirling of the retainer can be reduced, and the retainer can be adequately guided by the inner ring.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

DESCRIPTION OF THE EMBODIMENTS

A tapered roller bearing according to a first embodiment of the present invention is described with reference to FIG. 1 to FIG. 6. It should be noted that this tapered roller bearing 1 is used in a planetary part of a planetary reduction gear or a planetary transmission, which is described later with reference to FIG. 9 and FIG. 10.

Figure 1:
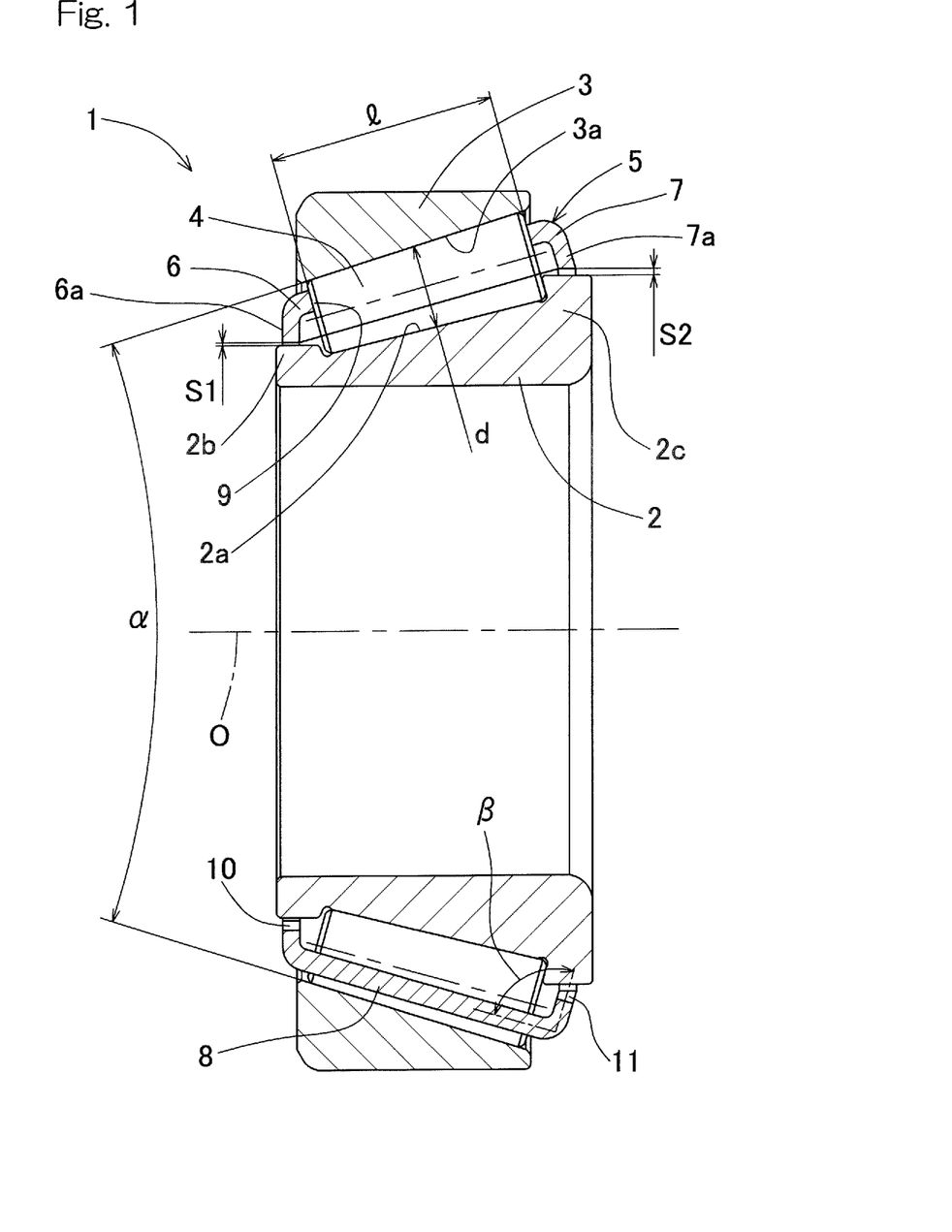
FIG. 1 is a section view of a tapered roller bearing according to a first embodiment of the present invention.

In FIG. 1, the tapered roller bearing 1 includes: an inner ring 2, an outer member 3, a plurality of tapered rollers 4 interposed between the inner ring 2 and the outer member 3, and a retainer 5 which retains the plurality of tapered rollers 4. The inner ring 2 includes a tapered rolling surface 2a having an increasing diameter from one end of an outer peripheral surface of the inner ring to the other end of the outer peripheral surface in the axial direction of the bearing, and is flanged on opposite sides with a small collar part 2b on the one end and a large collar part 2c on the other end. The outer member 3 is an annular component which includes a tapered rolling surface 3a facing the rolling surface 2a of the inner ring 2 and having an increasing diameter from one end to the other end. The outer member 3 is a component corresponding to an "outer ring" if this component only has a function for a bearing. This term, however, also encompasses in concept a component, for example, whose outer peripheral surface serves as a gear part and whose inner peripheral surface serves as the rolling surface 3a. Therefore, this component is called as "outer member" in this specification. It should be noted that in this specification, the "outer member" may be called as "outer ring" in the test and analysis examples, etc. The outer member 3 is not collared in the illustrated embodiment. The outer member 3, however, may include a collar part (not illustrated) protruding toward the radially inside at one end or the other end.

The retainer 5 includes: a small-diameter-side annular part 6, a large-diameter-side annular part 7, and pillar parts 8 arranged at a plurality of locations in the circumferential direction of the retainer and connecting the small-diameter-side annular part 6 and the large-diameter-side annular part 7. Adjacent pillar parts 8 define pockets 9 therebetween in which the tapered rollers 4 are retained. The small-diameter-side annular part 6 and the large-diameter-side annular part 7 of the retainer 5 have such diameters that the respective radially inner surfaces of the annular parts are guided by the small collar part 2b and the large collar part 2c of the inner ring 2, respectively. Thus, the tapered roller bearing 1 is of the inner ring-guided type. As long as the retainer 5 is of the inner ring-guided type, the retainer may be designed to be guided by only one of the small collar part 2b and the large collar part 2c of the inner ring 2. In general, the retainer is preferably designed to be guided by at least the small collar part 2b of the inner ring 2.

The retainer 5 is a press retainer made from a metal plate such as a steel plate in this embodiment, and the small-diameter-side annular part 6 and the large-diameter-side annular part 7 are formed by bending processing. The pillars 8 are formed by pressing to punch out the pockets 9. Besides, the retainer 5 may be made of a resin.

The dimensional relation of different parts of the tapered roller bearing 1 is described. A dimensionless number X is determined by the following formula defined by a small-diameter-side gap S1 which is a gap between the small-diameter-side annular part 6 of the retainer 5 and the small collar part 2b of the inner ring 2; a large-diameter-side gap S2 which is a gap between the large-diameter-side annular part 7 and the large collar part 2c of the inner ring 2; an average roller diameter d of the rollers 4; a roller length l of the rollers 4; and an outer member angle α (where a is from 20° to 40°) which is a tapering angle at which the rolling surface 3a of the outer member 3 is inclined (an angle defined by two linear lines representing the opposite rolling surfaces 3a in a section along a plane including the bearing axis O of the outer ring 3).

$$X = \frac{1}{\tan\alpha}\left(1 - \frac{S_1}{S_2}\frac{d}{l}\right) \quad \text{[Math 2]}$$

The thus-determined dimensionless number X falls within the range of 0.69<X<1.12. The dimensionless number X more preferably falls within the range of 0.73<X<1.046. In this regard, in the tapered roller bearing 1 of this embodiment, the outer member angle α falls within the range of from 20° to 40°.

Figure 2:
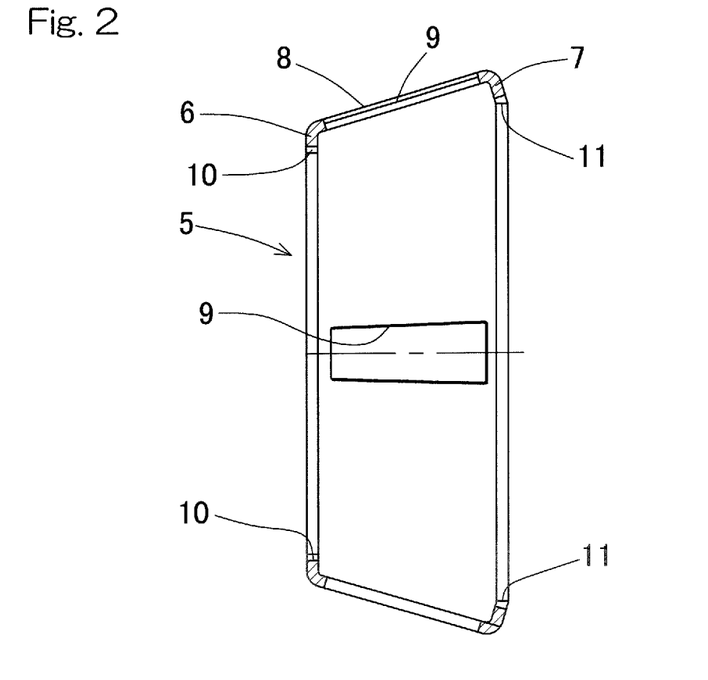
FIG. 2 is a section view of a retainer of the tapered roller bearing.

The small-diameter-side annular part 6 and the large-diameter-side annular part 7 of the retainer 5 include flanged parts 6a, 7a extending in a bending manner toward the radially inside with respect to the pillar parts 8. The flanged part 7a of the large-diameter-side annular part 7 defines a bending angle β with respect to the pillar parts 8 within the range of 90°±10° with reference to a retainer angle at which the pillar parts 8 are inclined with respect to the bearing axis O (in other words, with reference to the direction in which the pillar parts 8 extend). The radially inner surfaces of the small-diameter-side annular part 6 and the large-diameter-side annular part 7 are preferably parallel to the outer peripheral surfaces of the small collar part 2b and the large collar part 2c of the inner ring 2. The radially inner surfaces of the small-diameter-side annular part 6 and the large-diameter-side annular part 7, however, may be inclined with respect to the outer peripheral surfaces of the small collar part 2b and the large collar part 2c of the inner ring 2.

Figure 4:
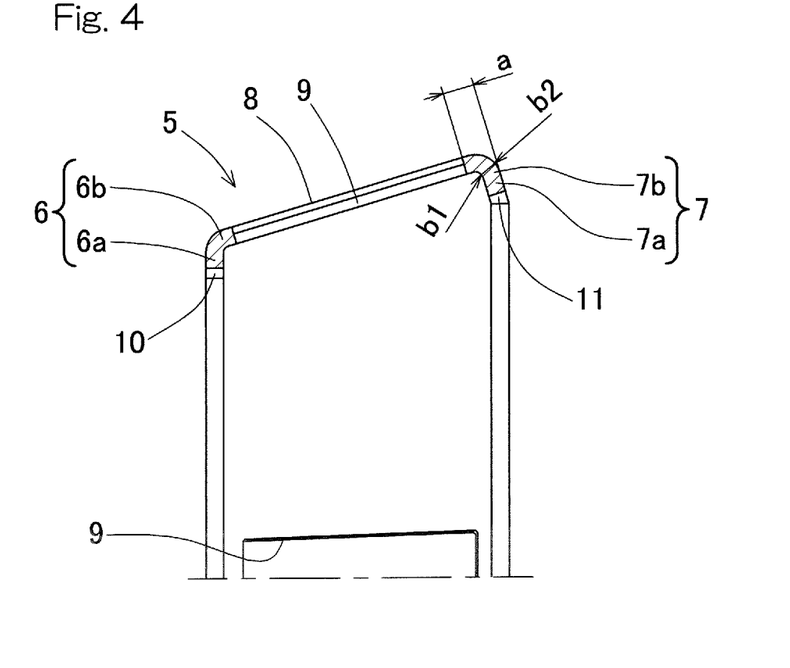
FIG. 4 is a partially enlarged section view of the retainer.
Figure 5:
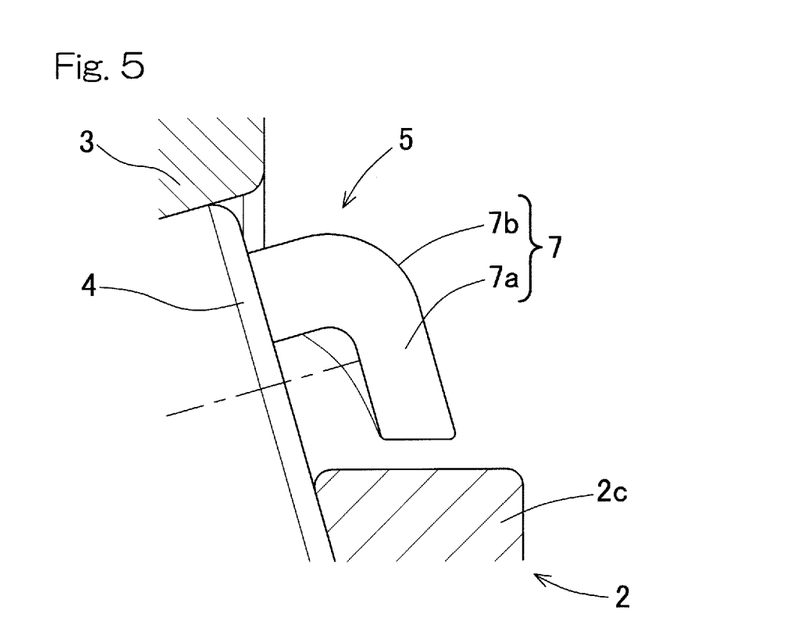
FIG. 5 is a partially enlarged section view showing a large-diameter-side annular part of the retainer and a tapered roller in a further enlarged manner.

As shown in FIG. 4 in an enlarged manner, more specifically, the flanged part 7a of the large-diameter-side annular part 7 of the retainer 5 is bent toward the radially inside with respect to the pillar parts 8 via the bent part 7b having an arc shape (see FIG. 4). The bent part R-dimension b1 which is the radius of curvature on the radially inner surface of the bent part 7b falls within the range of from 20% to 90% with respect to the axial length a which is the length of the large-diameter-side annular part 7 in the direction in which the pillar parts 8 extend. The bent part R-dimension b2 on the radially outer surface of the bent part 7b is not limited specifically.

Figure 3A:
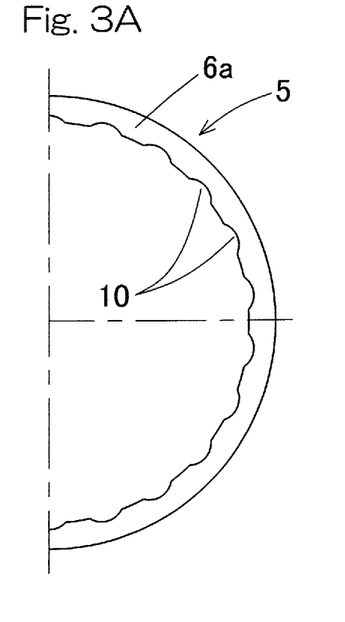
FIG. 3A is an end view showing a small-diameter-side end of the retainer.
Figure 3B:
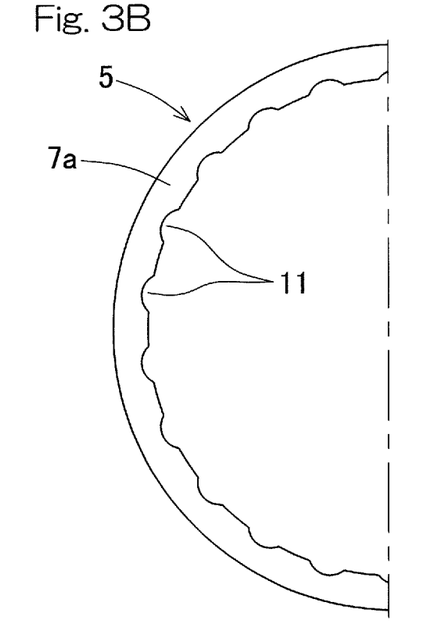
FIG. 3B is an end view showing a large-diameter-side end of the retainer.

The flanged parts 6a, 7a of the small-diameter-side annular part 6 and the large-diameter-side annular part 7 of the retainer 5 include, at a plurality of locations in the circumferential direction, oil passages 10, 11 which permit passage of lubricating oil inward and outward of the flanged parts 6a, 7a in the axial direction of the bearing. The oil passages 10, 11 in this embodiment have the form of cutouts at the inner peripheral edge of the flanged parts 6a, 7a, as shown in FIG. 3A and FIG. 3B. Specifically, the oil passages 10, 11 are arc-shaped cutouts.

Figure 7:
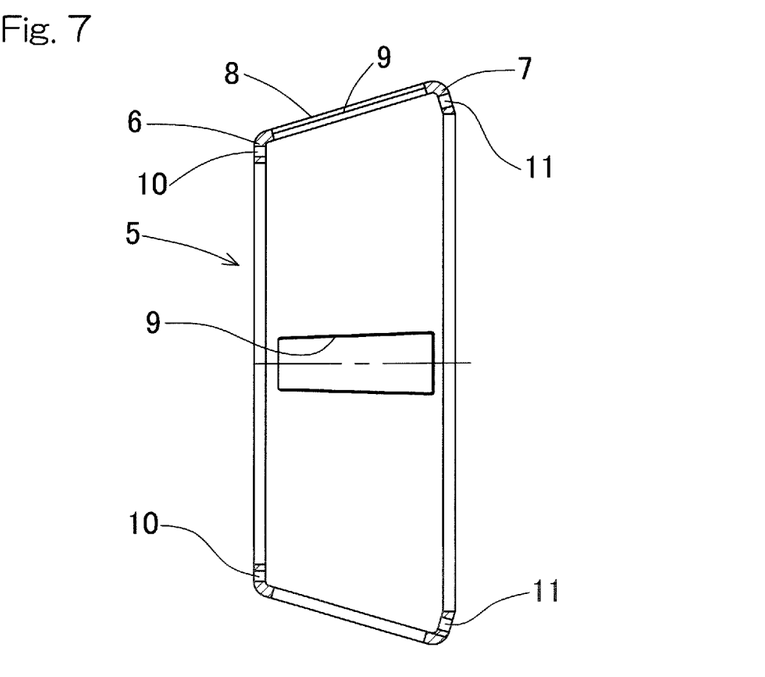
FIG. 7 is a section view showing a variant of a retainer used for the tapered roller bearing.
Figure 8A:
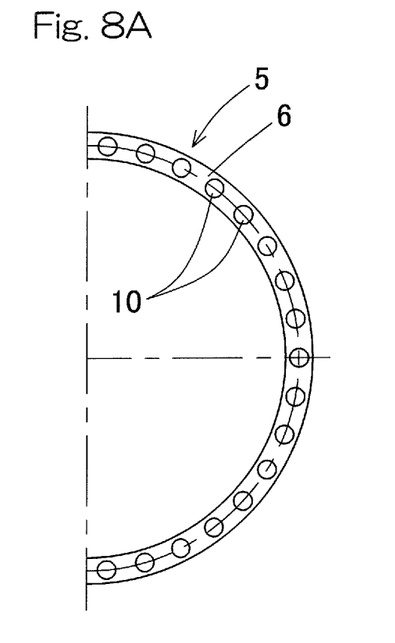
FIG. 8A is an end view showing a small-diameter-side end of the retainer.
Figure 8B:
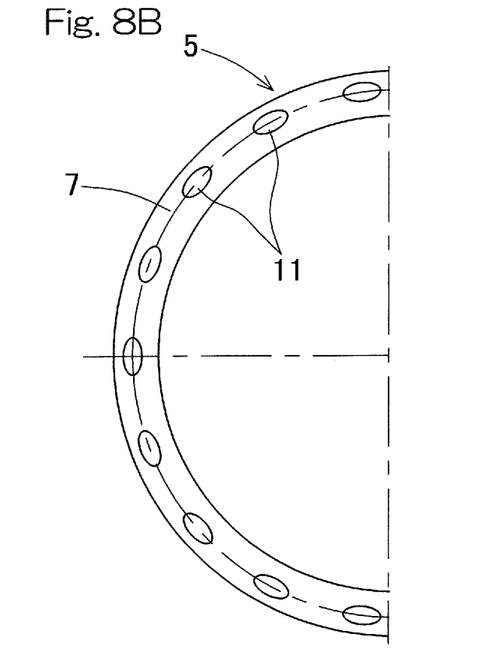
FIG. 8B is an end view of showing a large-diameter-side end of the retainer.

The oil passages 10, 11 may have the form of apertures as shown in FIG. 7, FIG. 8A and FIG. 8B. In FIG. 7, FIG. 8A and FIG. 8B, the flanged part 6a of the small-diameter-side annular part 6 have round oil passages 10, and the flanged part 7a of the large-diameter-side annular part 7 have oblong oil passages 11. The oil passages 10, 11 may be omitted.

In the embodiment illustrated in FIG. 1 to FIG. 8, the ratio of the section area of the large-diameter-side annular part 7 of the retainer 5 to the section area of the small-diameter-side annular part 6 falls within the range of from 1.0 to 1.2. As used herein, the ratio of the section areas is calculated based on section areas at circumferential locations where the oil passages 10, 11 are not located.

The effects of the above features are described below.

Figure 6:
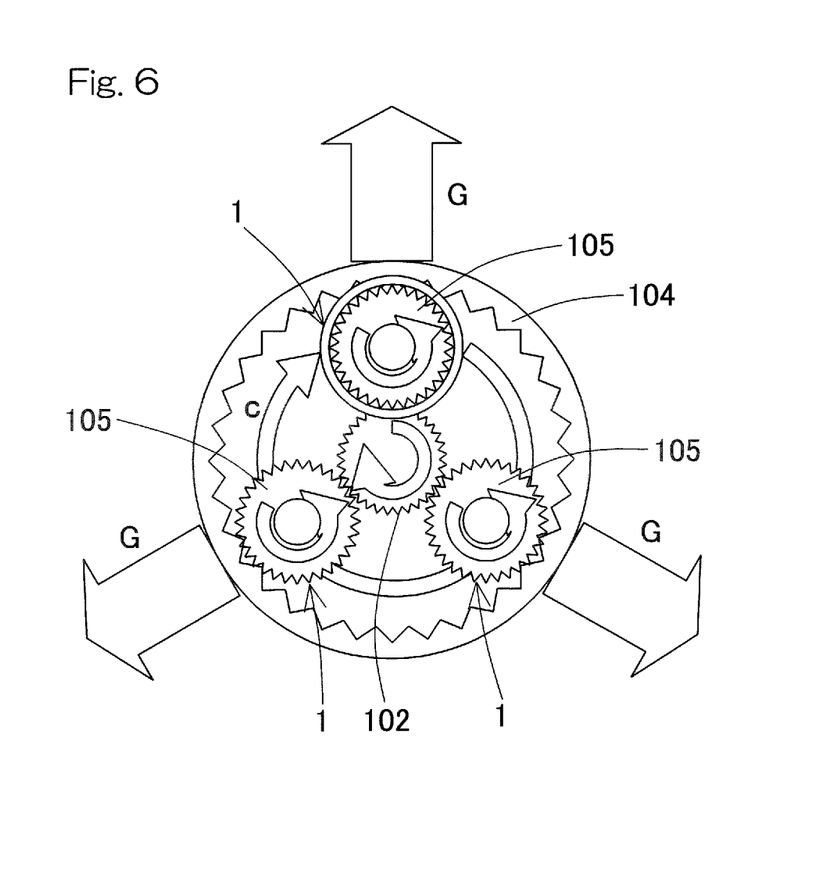
FIG. 6 illustrates centrifugal force acting on tapered roller bearings in a planetary reduction gear including the tapered roller bearings.

As shown in FIG. 6, the tapered roller bearing 1 is subjected to centrifugal force G when the tapered roller bearing is used in a revolving environment (as indicated by arrow c), such as a planetary part of a planetary reduction gear, and force acts on the retainer 5 shown in FIG. 1 due to the centrifugal force to cause the retainer to be tilted. In order to appropriately maintain the inclination of the retainer 5 during operation, use of an inner ring-guided retainer 5 alone is not sufficient, and it is necessary to appropriately control the gaps between the rollers 4 and the retainer 5 during operation (i.e., radial gap and axial gap), in addition to the gaps between the respective radially outer parts of the collars 2b, 2c of the inner ring 2 and the retainer 5 during standstill (i.e., the small-diameter-side gap S1 and the large-diameter-side gap S2). The gaps between the rollers 4 and the retainer 5 during operation are defined by the average roller diameter d and the roller length l.

With this in mind, a dimensionless X which is determined on the basis of the average roller diameter d and the roller length l was conceived in relation to the small-diameter-side gap S1 and the large-diameter-side gap S2, and it was found that tilting of the rotation axis of the retainer can be suppressed if the dimensionless X is within an appropriate range. This finding was confirmed by test and analysis. As a consequence, it was found that tilting of the rotation axis of the retainer 5 can be suppressed by controlling the ratio of the small-diameter-side gap S1 to the large-diameter-side gap S2 such that the dimensionless X falls within the range of 0.69<X<1.12.

The test and analysis were carried out to find out if samples can withstand centrifugal force of 30G or greater, in imitation of a planetary part of a planetary reduction gear. All the tapered roller bearings 1 in the test and analysis had the following dimensions: inner diameter 76×outer diameter 136.5×width 46.0 (unit:mm); and outer ring angle (outer member angle α) 35°. The dimensions (average roller diameter, roller length, small-diameter-side gap S1, large-diameter-side gap S2) of different parts of the tapered roller bearings 1 in the test and analysis were set to such that the dimensionless X had the values shown in Table 1, although these dimensions are omitted in the table.

TABLE 1

| Sample No. | (1) | (2) | (3) | (4) | (5) | (6) | (7) | (8) |
|---|---|---|---|---|---|---|---|---|
| X | 0.64 | 0.69 | 0.73 | 0.91 | 1.06 | 1.12 | 1.17 | 1.23 |
| Test Results (Condition of Retainer) | Poor | Good | Good | Good | Good | Good | Poor | Poor |

Good: no wear or little wear (continuously usable), Poor: severe wear (not continuously usable) As can be seen in Table 1 which shows the results of the test and analysis, favorable results (little or no wear in the retainer 5) were obtained in the range of 0.69<X<1.12, in which Samples (2) to (6) are included. In particular, Samples (3), (4) had no wear, indicating that X is more preferably within the range of 0.73<X<1.04.

Thus, by reducing the difference between the gaps S1, S2 on the small diameter side and the large diameter side, the gaps being defined between the radially outer parts of the inner ring collars 2b, 2c the radially inner parts of the retainer 5, the tapered roller bearing 1 can be rotated with a smaller offset between the rotation axis of the retainer 5 and the axis of the inner ring 2 when centrifugal force acts. This makes it possible to reduce unbalanced whirling of the retainer 5 and thereby to suppress wear of the retainer 5. Reduction in unbalanced whirling of the retainer 5 makes it possible to reduce axial movement of the retainer 5 due to gyro moment and to operate the tapered roller bearing 1 in a stable state.

The outer member angle α is set within the range of from 20° to 40° for the following reasons.

A bearing having an outer member angle α of 20° or less has small capacity to support axial load. A bearing having an outer member angle α of 40° or greater has large capacity to support axial load, but has small capacity to support radial load. Since tapered roller bearings used in environment where centrifugal force acts, such as a planetary reduction gear part, mainly support radial load, bearing products having a large outer member angle α are rarely employed. In addition, bearing products having an outer member angle of 20° or less may not have sufficient capacity to support axial load, in a case where axial load is generated due to gear engagement in planetary reduction gears or the like.

In the retainer 5, the bending angle β of the flanged part 7a of the large-diameter-side annular part 7 (a bending angle of the flanged part 7a relative to the pillar parts 8) falls within the range of 90°±10° with reference to the retainer angle. For this reason, the retainer 5 can have an appropriate shape as an inner ring-guided retainer.

Since the bent part 7b of the large-diameter-side annular part 7 of the retainer 5 has a bent part R-dimension b1 (FIG. 4) on the radially inner surface within the range of from 20% to 90% relative to the axial length a of the large-diameter-side annular part 7, the following issues do not occur. That is, in a case where the bent part R-dimension b1 is 20% or lower relative to the axial length a of the large-diameter-side annular part 7, greater stress concentration may occur during bending processing, possibly causing damage to the retainer 5. On the other hand, in a case where the bent part R-dimension is 90% or higher, the radially inner surface of the bent part 7b curves too gradually in arc shape as indicated by a fine line in FIG. 5, so that the edges of the end faces of the rollers 4 could interfere with the opening edges of the pockets 9. Such a problem can be eliminated by setting the dimension within the range of from 20 to 90%.

In this embodiment, since the flanged parts 6a, 7a of the small-diameter-side annular part 6 and the large-diameter-side annular part 7 of the retainer 5 include oil passages 10, 11 in the form of cutouts or apertures at a plurality of locations in the circumferential direction as described above, the following effects can be obtained. That is to say, formation of the oil passages 10, 11 can facilitate passage of lubricating oil inward and outward of the flanged parts 6a, 7a of the retainer 5. Therefore, good lubrication can be achieved between the rolling surfaces of the tapered rollers 4 and the pocket inner surfaces of the retainer 5.

In addition, since the ratio of the section area of the large-diameter-side annular part 7 of the retainer 5 to the section area of the small-diameter-side annular part 6 falls within the range of from 1.0 to 1.2, the following effects can be obtained. That is to say, in a case where the ratio of the section areas falls within the range of from 1.0 to 1.2, the retainer can have appropriate weight balance between the large diameter side and the small diameter side, so that unbalanced whirling of the retainer 5 can be reduced, and the retainer can be adequately guided by the inner ring.

Figure 9:
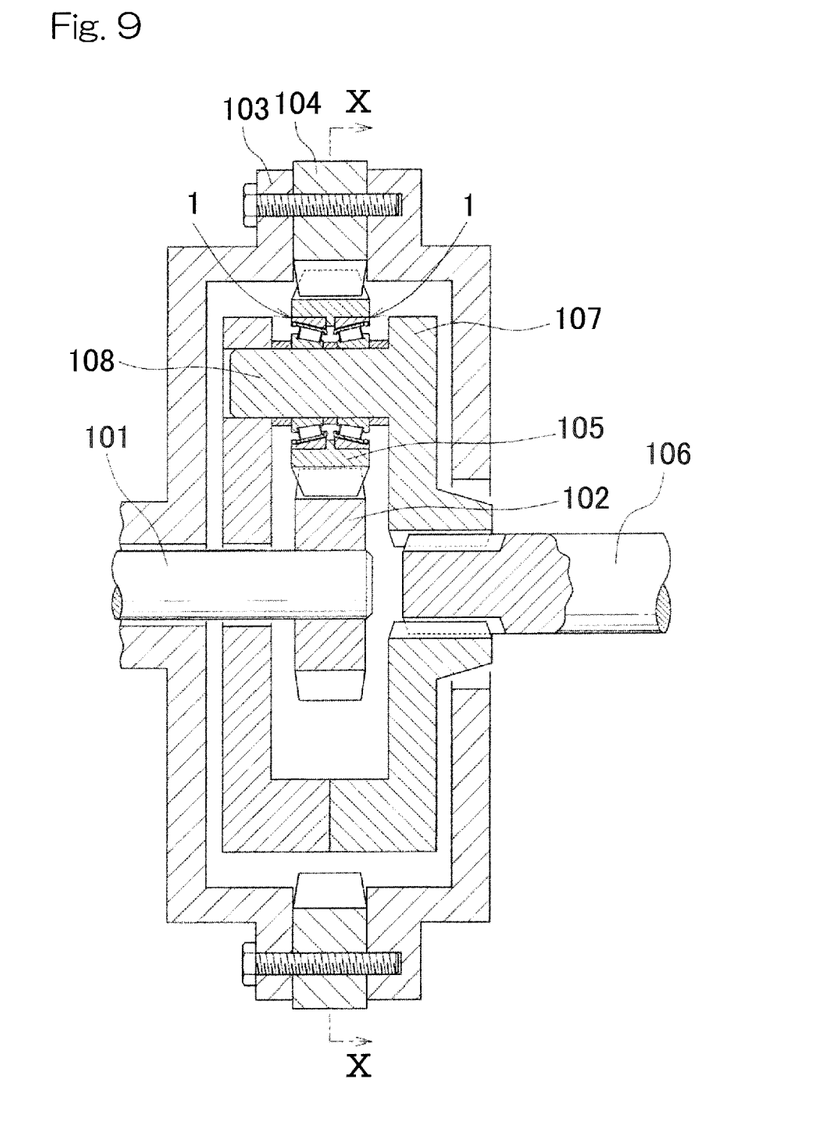
FIG. 9 is a section view showing an example of a planetary reduction gear including the tapered roller bearings.
Figure 10:
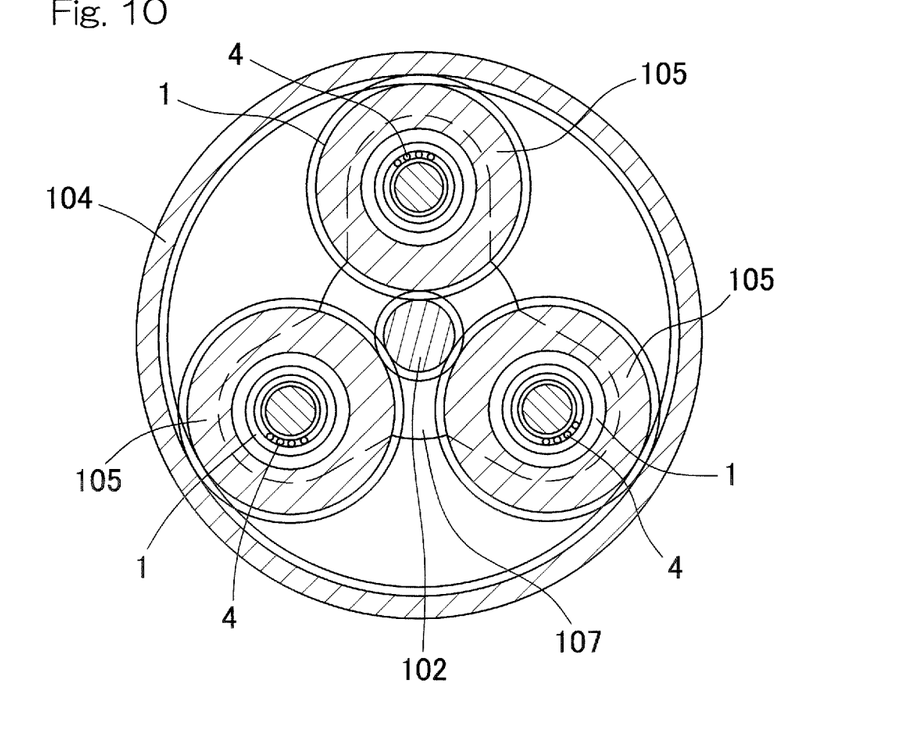
FIG. 10 is a section view along line X-X of FIG. 9.

FIG. 9 and FIG. 10 show one example of a planetary reduction gear in which the tapered roller bearing 1 according to the above-described embodiment is used. This planetary reduction gear includes a plurality of planetary rotating bodies 105 as planetary gears which engage with a sun gear 102 attached to an input shaft 101 and an internal gear 104 fixed to a housing 103, between these gears 102, 104. Each planetary rotating body 105 is supported in a rotatable manner with respect to a carrier 107 coupled to an output shaft 106, and revolutionary motion of this planetary rotating body 105 which revolves while rotating between the sun gear 102 and the inner gear 104 is outputted to the output shaft 106 through the carrier 107. The planetary reduction gears, for example, serve to reduce the speed of rotation in a first stage of a final reduction gear disposed inside a wheel rim of a construction machine.

A pair of tapered roller bearings 1 are arranged between a planetary rotating body 105 and the carrier 107 of the planetary reduction gear. The respective outer members 3 (FIG. 1) of the tapered roller bearings 1 are attached to the planetary rotating body 105 and rotate together with the planetary rotating body 105. The respective inner rings 2 of the tapered roller bearings 1 are attached in a fixed manner to a support shaft 108 of the carrier 107.

Figure 11A:
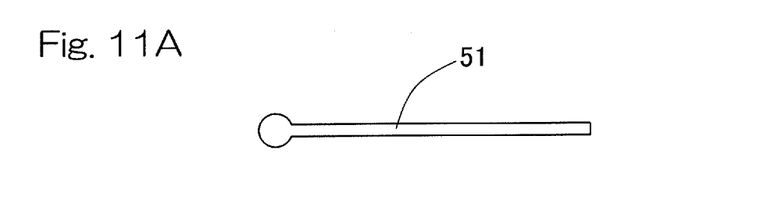
FIG. 11A illustrates an example of a gauge used to control a gap in the tapered roller bearing.
Figure 11B:
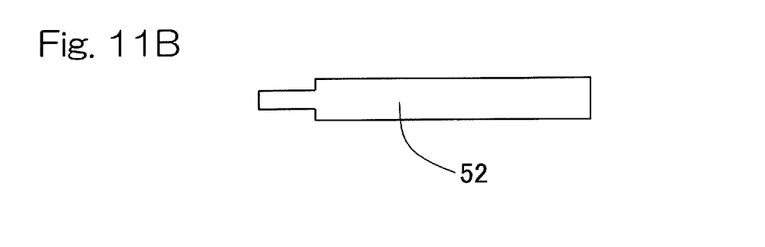
FIG. 11B illustrates another example of a gauge used to control a gap in the tapered roller bearing.

It should be noted that the small-diameter-side gap S1 and the large-diameter-side gap S2 change depending on, e.g., insufficient swaging of the small-diameter-side annular part 6 of the retainer 5 during assembling. For this reason, the small-diameter-side gap S1 is measured, for example, in a following manner. A reference gap gauge 51 shown in FIG. 11A and FIG. 11B is inserted between the radially inner part of the retainer and the radially outer part of the inner ring collar at positions with a 180°-phase difference to measure the small-diameter-side gap S1 at the 0°-phase and at the 180°-phase. An average of the measurements is taken as a reference gap. Then, the reference gap gauge 51 is inserted into the small-diameter-side gap S1 to obtain the reference gap (the above-described average) at one position. In this state, a measurement gap gauge 52 is inserted at the position separated by 180°-phase therefrom to measure the small-diameter-side gap S1 and determine if the measured value is within the appropriate range.

Although the present invention has been fully described in connection with the embodiments thereof, the embodiments disclosed herein are merely examples in all respects and are not to be taken as limiting the scope of the present invention in any way whatsoever. The scope of the present invention is to be determined by the appended claims, not by the above description, and is intended to include any change made within the scope of claims or equivalent thereto.

REFERENCE NUMERALS

1 . . . tapered roller bearing
2 . . . inner ring
2a . . . rolling surface
2b . . . small collar part
2c . . . large collar part
3 . . . outer member
4 . . . tapered roller
5 . . . retainer
3a . . . rolling surface
6 . . . small-diameter-side annular part
6a . . . flanged part
7 . . . large-diameter-side annular part
7a . . . flanged part
7b . . . bent part
8 . . . pillar part
9 . . . pocket
10, 11 . . . oil passage
S1 . . . small-diameter-side gap
S2 . . . large-diameter-side gap
d . . . average roller diameter
l . . . roller length
α . . . outer member angle
X . . . dimensionless number

What is claimed is:
1. A tapered roller bearing of inner ring-guided type comprising:

an inner ring including collars on opposite sides of the inner ring, an outer member including a rolling surface having an annular shape, the rolling surface facing a rolling surface of the inner ring, a plurality of tapered rollers interposed between the inner ring and the outer member, and a retainer configured to retain the plurality of tapered rollers, the retainer including: a small-diameter-side annular part, a large-diameter-side annular part, and pillar parts which are arranged at a plurality of positions in a circumferential direction and connect the small-diameter-side annular part and the large-diameter-side annular part, wherein a dimensionless number X falls within a range of 0.69<X<1.12, the dimensionless number X defined by the formula:

$$X = \frac{1}{\tan\alpha}\left(1 - \frac{S_1}{S_2}\frac{d}{l}\right)$$

wherein a small-diameter-side gap S1 which is a gap between the small-diameter-side annular part of the retainer and a small collar part of the inner ring, a large-diameter-side gap S2 which is a gap between the large-diameter-side annular part and a large collar part of the inner ring, an average roller diameter d, a roller length l, and an outer member angle $\alpha$ (where $\alpha$ is from 20° to) 40° which is a tapering angle at which the rolling surface of the outer member is inclined.

2. The tapered roller bearing as claimed in claim 1, wherein the large-diameter-side annular part of the retainer includes a flanged part extending in a bending manner toward a radially inside with respect to the pillar parts, and the flanged part defines a bending angle with respect to the pillar parts within a range of 90°±10° with reference to a retainer angle at which the pillar parts are inclined with respect to a bearing axis.

3. The tapered roller bearing as claimed in claim 1, wherein the small-diameter-side annular part and the large-diameter-side annular part of the retainer include flanged parts extending in a bending manner toward a radially inside with respect to the pillar parts, and the flanged parts include, at a plurality of locations in a circumferential direction, oil passages in the form of cutouts or apertures which permit passage of lubricating oil inward and outward of the flanged parts in an axial direction of the bearing.

4. The tapered roller bearing as claimed in claim 1, wherein a ratio of a section area of the large-diameter-side annular part of the retainer to a section area of the small-diameter-side annular part in an axial section area falls within a range of from 1.0 to 1.2.

5. The tapered roller bearing as claimed in claim 1, wherein the tapered roller bearing is used in a planetary part of a planetary reduction gear or a planetary transmission.

6. A tapered roller bearing of inner ring-guided type comprising:

an inner ring including collars on opposite sides of the inner ring, an outer member including a rolling surface having an annular shape, the rolling surface facing a rolling surface of the inner ring, a plurality of tapered rollers interposed between the inner ring and the outer member, and a retainer configured to retain the plurality of tapered rollers, the retainer including: a small-diameter-side annular part, a large-diameter-side annular part, and pillar parts which are arranged at a plurality of positions in a circumferential direction and connect the small-diameter-side annular part and the large-diameter-side annular part, wherein a dimensionless number X falls within a range of 0.69<X<1.12, the dimensionless number X defined by the formula:

$$X = \frac{1}{\tan\alpha}\left(1 - \frac{S_1}{S_2}\frac{d}{l}\right)$$

wherein a small-diameter-side gap S1 which is a gap between the small-diameter-side annular part of the retainer and a small collar part of the inner ring, a large-diameter-side gap S2 which is a gap between the large-diameter-side annular part and a large collar part of the inner ring, an average roller diameter d, a roller length l, and an outer member angle $\alpha$ (where $\alpha$ is from 20° to) 40° which is a tapering angle at which the rolling surface of the outer member is inclined, and wherein the large-diameter-side annular part of the retainer includes a flanged part extending in a bending manner toward a radially inside with respect to the pillar parts via a bent part having an arc shape, and the bent part has a bent part R-dimension which is a radius of curvature on a radially inner surface of the bent part within a range of from 20% to 90% relative to an axial length which is a length of the large-diameter-side annular part in a direction in which the pillar parts extend.

* * * * *